US 10,240,081 B2

(12) United States Patent
Shchepelina et al.

(10) Patent No.: US 10,240,081 B2
(45) Date of Patent: Mar. 26, 2019

(54) CROSSLINKER COMPOSITION INCLUDING SYNTHETIC LAYERED SILICATE

(71) Applicant: Ecolab USA Inc., St. Paul, MN (US)

(72) Inventors: Olga Shchepelina, Sugar Land, TX (US); Houston Perry, Richmond, TX (US); Pious Kurian, Sugar Land, TX (US)

(73) Assignee: Ecolab USA Inc., St. Paul, MN (US)

( * ) Notice: Subject to any disclaimer, the term of this patent is extended or adjusted under 35 U.S.C. 154(b) by 76 days.

(21) Appl. No.: 15/151,950

(22) Filed: May 11, 2016

(65) Prior Publication Data

US 2016/0333255 A1 Nov. 17, 2016

Related U.S. Application Data

(60) Provisional application No. 62/160,395, filed on May 12, 2015.

(51) Int. Cl.
*C09K 8/68* (2006.01)
*C09K 8/03* (2006.01)
*C09K 8/88* (2006.01)

(52) U.S. Cl.
CPC .............. *C09K 8/685* (2013.01); *C09K 8/032* (2013.01); *C09K 8/887* (2013.01); *C09K 2208/10* (2013.01)

(58) Field of Classification Search
CPC .......... C09K 8/032; C09K 8/05; C09K 8/685; C09K 8/887; C09K 2208/10; E21B 43/26; E21B 43/267
See application file for complete search history.

(56) References Cited

U.S. PATENT DOCUMENTS

| | | | |
|---|---|---|---|
| 4,480,072 A | 10/1984 | Mallon | |
| 4,514,309 A | 4/1985 | Wadhwa | |
| 4,619,776 A | 10/1986 | Mondshine | |
| 5,082,579 A | 1/1992 | Dawson | |
| 5,145,590 A | 9/1992 | Dawson | |
| 5,160,643 A | 11/1992 | Dawson | |
| 6,936,575 B2 | 8/2005 | Dobson, Jr. et al. | |
| 2003/0144154 A1* | 7/2003 | Dobson, Jr. .............. | C09K 8/62 507/200 |
| 2003/0213593 A1* | 11/2003 | Bouwmeester ...... | C09K 8/5045 166/270 |
| 2012/0283148 A1* | 11/2012 | Dobson, Jr. .............. | C09K 8/04 507/103 |
| 2014/0034323 A1 | 2/2014 | Dobson, Jr. et al. | |

FOREIGN PATENT DOCUMENTS

| | | |
|---|---|---|
| EP | 0962626 A2 | 12/1999 |
| WO | 2014019749 A1 | 2/2014 |
| WO | 2014144813 A2 | 9/2014 |

OTHER PUBLICATIONS

The International Search Report and Written Opinion dated Jul. 27, 2016 in connection with International Application No. PCT/US2016/031825.
Extended European Search Report dated Dec. 4, 2018 in Application No. 16793436.3, 6 pages.

\* cited by examiner

*Primary Examiner* — Frances Tischler
(74) *Attorney, Agent, or Firm* — Kagan Binder, PLLC

(57) ABSTRACT

Disclosed herein are crosslinker compositions for aqueous hydroxyl functional polymers. The compositions include at least one borate species, about 0.05 wt % to 10 wt % of a synthetic layered silicate, and a water source. The compositions are characterized by shelf stability, wherein the sparingly soluble borate does not undergo sedimentation. The crosslinker compositions are usefully added to aqueous polymer solutions of hydroxyl functional polymers to form injectable compositions for hydraulic fracturing.

23 Claims, 5 Drawing Sheets

CROSSLINKER COMPOSITION INCLUDING SYNTHETIC LAYERED SILICATE

TECHNICAL FIELD

The invention is concerned with crosslinker compositions for aqueous hydroxyl functional polymers.

BACKGROUND

Hydraulic fracturing is a widely used method for stimulating petroleum producing subterranean formations and is commonly performed by contacting the formation with a viscous fracturing fluid having particulated solids, widely known as propping agents or proppants, suspended therein, applying sufficient pressure to the fracturing fluid to open a fracture in the subterranean formation, and maintaining this pressure while injecting the fracturing fluid into the fracture at a sufficient rate to extend the fracture into the formation. When the pressure is reduced, the propping agent within the fracture prevents the complete closure of the fracture.

The properties that a fracturing fluid should possess are amongst others, low leakoff rate, the ability to carry a propping agent, low pumping friction loss, and easy removal from the formation. Low leakoff rate is the property that permits the fluid to physically open the fracture and one that controls its areal extent. The rate of leakoff to the formation is dependent upon the viscosity and the wall-building properties of the fluid. Viscosity and wall-building properties are controlled by the addition of appropriate additives to the fracturing fluid. The ability of the fluid to suspend the propping agent is controlled by additives. Essentially, this property of the fluid is dependent upon the viscosity and density of the fluid and upon its velocity. Friction reducing additives are added to fracturing fluids to reduce pumping loss due to friction by suppression of turbulence in the fluid. To achieve the maximum benefits from fracturing, the fracturing fluid must be removed from the formation. This is particularly true with very viscous fracturing fluids. Most of such viscous fluids have built-in breaker systems that reduce the viscous gels to low viscosity solutions upon exposure to the temperatures and pressures existing in the formations. When the viscosity is lowered, the fracturing fluid may be readily produced from the formation. The use of aqueous based fluids to formulate fracturing fluids is well known. Such fluids generally contain a water soluble polymer viscosifier. Sufficient polymer is used to suspend the propping agent, decrease the leakoff rate, and decrease the friction loss of the fracturing fluid. Supplemental additives are generally required to further decrease the leakoff rate, such as hydrocarbons or inert solids, such as silica flour.

Various water soluble polymers have been used, or proposed for use as viscosifiers for aqueous based fracturing fluids, such as polyacrylamides, partially hydrolyzed polyacrylamides, and various polysaccharide polymers such as guar gum and derivatives thereof, and cellulose derivatives. Of these, guar gum and guar gum derivatives are the most widely used viscosifiers. Guar gum is suitable for thickening both fresh and salt water, including saturated sodium chloride brines.

It is known to provide concentrated suspensions of borate-containing crosslinking agents for the preparation of crosslinked fracturing fluids including hydroxyl functional polymers. See for example U.S. Pat. Nos. 4,514,309; 5,082,579; 5,145,590; and 5,160,643. U.S. Pat. No. 4,619,776 discloses the use of sparingly soluble borates for the controlled crosslinking of hydroxyl functional polymer-containing hydraulic fracturing fluids. Concentrated suspensions of such borates in hydrocarbon base fluids have been utilized for the crosslinking of fracturing fluids containing guar gum or derivatives thereof, particularly hydroxypropyl guar, and have achieved commercial success. These concentrates contain an organophilic clay suspending agent to keep the borate crosslinking agent suspended therein, thus preventing settling thereof. Additionally, U.S. Pat. No. 6,936,575 discloses aqueous suspensions of sparingly soluble borates thickened with palygorskite clays (aluminum silicate-based natural clay products), but requires a saturated borate solution as a starting material in forming the suspensions.

In aqueous environments, hydroxyl groups positioned in the cis-form on adjacent carbon atoms of a polymer, or on carbon atoms in a 1,3-relationship react with borates to form five or six member ring complexes. At pH above about 8.0, these complexes form crosslinked complexes. The reaction is fully reversible with changes in pH. An aqueous solution of the hydroxy-functional polymer will become highly viscous in the presence of borate anions when the solution is made alkaline, and will liquefy again when the pH is lowered below about 8. The critical pH at which gelation occurs may be modified by the concentration of dissolved salts, which are known to change the pH at which a sufficient quantity of dissociated borate ions exists in solution to cause gelation. The addition of an alkali metal base such as sodium hydroxide enhances the effect of condensed borates such as borax by converting the borax to the dissociated metaborate.

Known polymers which contain a substantial content of reactive hydroxyl groups include, for example, guar gum, locust bean gum, dextrin, polyvinyl alcohol, and derivatives of these polymers as well as mixtures of two or more thereof.

Depending on the relative concentration of polymer, and borate anion, the crosslinking reaction may produce useful gels, or may lead to insolubilization, precipitation, or unstable, non-useful gels. The viscosity of the hydrated polymer solution increases with an increase in the concentration of borate anion until a maximum is obtained. Thereafter the viscosity decreases and the gel becomes unstable as evidenced by a lumpy, inhomogeneous appearance and syneresis. As the temperature of the solution increases, the concentration of borate required to maintain the maximum degree of crosslinking, and thus maximum viscosity increases.

Concentrated aqueous suspensions of the sparingly soluble, alkaline earth or alkali metal alkaline earth metal borates have also been commercially successful. Such aqueous concentrates contain a high concentration of the sparingly soluble borate. The concentrates are added in the field to an aqueous hydraulic fracturing fluid containing the polymer to be crosslinked. Typical problems with the concentrates include settling of the solids prior to the use thereof in a crosslinking reaction. The sparingly soluble boron-containing particulates present in the aqueous suspension tend to settle because the particulates are substantially denser than water.

Thus, there is a need in the industry to develop concentrated aqueous suspensions of sparingly soluble, alkaline earth or alkali metal alkaline earth metal borates that are shelf stable and not prone to settling.

SUMMARY

Disclosed herein is a crosslinker composition comprising about 5 wt % to 65 wt % of a borate species; about 0.05 wt % to 10 wt % of a synthetic layered silicate; and a water source. In some embodiments, the borate species is $Na_2[B_4O_5(OH)_4]\cdot 8H_2O$. In some such embodiments, the composition comprises about 0.5 wt % to 30 wt % of the borate species. In some embodiments, the borate species comprises a sparingly soluble borate having the chemical formula

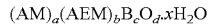

$$(AM)_a(AEM)_bB_cO_d\cdot xH_2O$$

wherein a, b, c and d are integers, $0 \leq a \leq 2$, $1 \leq b \leq 4$, $2 \leq c \leq 14$, $d=[0.5a+b+1.5c]$, $0<x<20$, AM is an alkali metal, and AEM is an alkaline earth metal. In some such embodiments, the composition comprises about 30 wt % to 50 wt % of the sparingly soluble borate. In some embodiments, the sparingly soluble borate is Ulexite. In some embodiments, the borate species comprises a combination of $Na_2[B_4O_5(OH)_4]\cdot 8H_2O$ and a sparingly soluble borate, for example about 0.5 wt % to 30 wt % $Na_2[B_4O_5(OH)_4]\cdot 8H_2O$ and about 30 wt % to 50 wt % of the sparingly soluble borate.

In some embodiments, the crosslinker composition comprises about 0.5 wt % to 2 wt % of the synthetic layered silicate. In some embodiments, the synthetic layered silicate is characterized by the substantial absence of aluminum species, calcium species, or both aluminum and calcium species. In some embodiments, the synthetic layered silicate is a lithium-magnesium-sodium silicate. In some embodiments, the synthetic layered silicate is characterized as having the chemical formula $Na_{0.3}(Mg,Li)_3Si_4O_{10}(OH)_2$. In some embodiments, the surface area of the synthetic layered silicate is about 700 $m^2/g$ to 1500 $m^2/g$. In some embodiments, the water source is present at about 30 wt % to 80 wt %. In some embodiments, the water source has a density of about 998 $kg/m^3$ to 1050 $kg/m^3$. In some embodiments, the composition further comprises one or more freezing point depressants, surfactants, gel stabilizing agents, suspension stabilizing agents, salts, additional boron-containing compounds, biocides, natural clay materials, or a combination of two or more thereof.

Also disclosed herein is a method of forming an injectable composition, the method comprising: forming a crosslinker composition comprising about 5 wt % to 65 wt % of a borate species, about 0.05 wt % to 10 wt % of a synthetic layered silicate, and a water source; forming an aqueous polymer solution comprising about 0.01 wt % to 5 wt % of an hydroxyl functional polymer; and combining the crosslinker composition with the aqueous polymer solution at a ratio of about 1:100 to 1:5000 vol:vol crosslinker composition: aqueous polymer solution to form an injectable composition having a pH of about 8 to 14. In some embodiments, the aqueous polymer solution comprises about 0.5 wt % to 2 wt % of an hydroxyl functional polymer. In some embodiments, the hydroxy functional polymer is guar gum. In some embodiments, the ratio is about 1:200 to 1:2000.

Also disclosed herein is a method of recovering hydrocarbon compounds, the method comprising forming a crosslinker composition comprising about 5 wt % to 65 wt % of a borate species, about 0.05 wt % to 10 wt % of a synthetic layered silicate, and a water source; forming an aqueous polymer solution comprising about 0.01 wt % to 5 wt % of an hydroxyl functional polymer; combining the crosslinker composition with the aqueous polymer solution at a ratio of about 1:100 to 1:5000 vol:vol crosslinker composition: aqueous polymer solution to form an injectable composition having a pH of about 8 to 14; injecting the injectable composition into one or more subterranean hydrocarbon-containing reservoirs; and recovering hydrocarbon compounds from the one or more reservoirs.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Figure 1A:
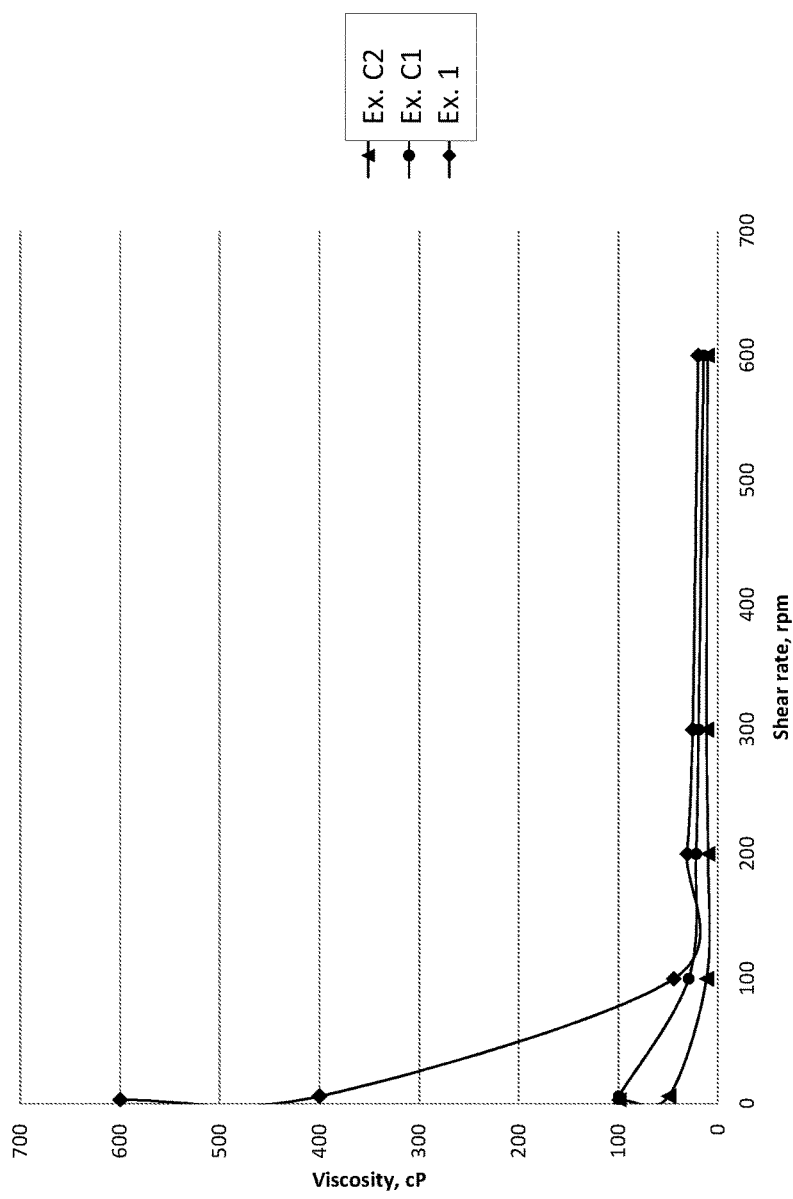
FIG. 1A is a plot showing viscosity as a function of shear rate at 20° C. for a composition of the invention and two other compositions.

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

As used herein, the term "synthetic layered silicate" means an inorganic layered silicate that is manufactured and has a substantially uniform chemical formula. One or more components of the synthetic layered silicate may be derived from naturally occurring inorganic mineral sources.

As used herein, the term "water source" means a source of water having a density of about 998 $kg/m^3$ to 1200 $kg/m^3$ and comprising, consisting essentially of, or consisting of water, fresh water, tap water, deionized water, distilled water, municipal water, treated or partially treated waste water, well water, or a combination of two or more such water sources as determined by context. In some embodiments, a water source includes one or more salts, ions, buffers, acids, or bases, surfactants, or other dissolved, dispersed, or emulsified compounds, materials, components, or combinations thereof. In some embodiments, a water source includes about 0 wt % to 30 wt % total dissolved non-polymeric solids. The terms "aqueous", "waterbased", "water solution", and the like generally refer to a composition including a water source listed herein. Generally and as determined by context, the term "water source" includes high temperature water sources.

As used herein, the term "sparingly soluble" means having a solubility in water of less than 10 $kg/m^3$ at 22° C.

As used herein, the terms "shelf stable" or "shelf stability", in context, refer to a composition that undergoes about 5% sedimentation or less of dispersed solid phase within a liquid phase in about 72 hours when allowed to remain undisturbed in a sealed vessel at about 20° C., as determined by light backscattering measurements.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property, a measurable quantity, a method, a position, a value, or a range, employed in describing the embodiments of the disclosure, refers to a variation that does not affect the overall recited composition, property, quantity, method, position, value, or range thereof in a manner that negates an intended composition, property, quantity, method, position, value, or range. Examples of intended properties include, solely by way of nonlimiting examples thereof, flexibility, partition coefficient, rate, solubility, temperature, and the like; intended values include thickness, yield, weight, concentration, and the like. The effect on methods that are modified by "substantially" include the effects caused by variations in type or amount of materials used in a process, variability in machine settings, the effects of ambient conditions on a process, and the like wherein the manner or degree of the effect does not negate one or more intended properties or results; and like proximate considerations. Where modified by the term "substantially" the claims appended hereto include equivalents to these types and amounts of materials.

Discussion

Disclosed herein are aqueous crosslinking compositions for use in forming crosslinked polymers in aqueous hydraulic fracturing fluids. The crosslinking compositions are advantageously combined with aqueous polymer dispersions comprising at least one hydroxylated polymer to yield an injectable composition. The injectable compositions become a crosslinked composition after a period of time.

Crosslinking Compositions

The aqueous crosslinking compositions of the invention include at least a synthetic layered silicate, a borate species, and a water source having a density of about 1.0 to 1.2 kg/m$^3$. The borate species is present at about 5 wt % to 65 wt % based on the composition weight. The synthetic layered silicate is present at about 0.05 wt % to 10 wt % based on the composition weight.

In some embodiments, the synthetic layered silicate usefully employed in the crosslinking compositions is characterized by the absence of calcium. In some embodiments, the synthetic layered silicate is characterized by the absence of aluminum. In some embodiments, the synthetic layered silicate usefully employed in the crosslinking compositions is characterized by the absence of both calcium and aluminum. In some embodiments, the synthetic layered silicate comprises, consists essentially of, or consists of a lithium-magnesium-sodium silicate. In some embodiments, the synthetic layered silicate has the chemical formula $Na_{0.3}(Mg, Li)_3Si_4O_{10}(OH)_2$, also referred to as synthetic hectorite. The synthetic layered silicate has a layered, plate-like particle morphology wherein the physical surface area of the particulate (primarily provided by the major plate surfaces of the particulate) is least about 700 m$^2$/g, for example about 700 m$^2$/g to 1500 m$^2$/g. In some embodiments, the average particle size of the synthetic layered silicate is about 5 nm to 500 nm in the longest direction, for example about 5 nm to 400 nm, or about 5 nm to 300 nm, or about 5 nm to 200 nm, or about 5 nm to 100 nm, or about 5 nm to 50 nm, or about 10 nm to 500 nm, or about 15 nm to 500 nm, or about 20 nm to 500 nm, or about 10 nm to 250 nm, or about 10 nm to 100 nm, or about 10 nm to 50 nm, or about 15 nm to 100 nm, or about 15 nm to 50 nm in the longest direction. In some embodiments, the aspect ratio of the synthetic layered silicate is about 1000:1 to 5:1, or about 500:1 to 5:1, or about 300:1 to 5:1, or about 200:1 to 5:1, or about 100:1 to 5:1.

In embodiments, the amount of the synthetic layered silicate in the crosslinking compositions of the invention is about 0.05 wt % to 10 wt % based on the weight of the crosslinking composition, or about 0.1 wt % to 10 wt %, or about 0.15 wt % to 10 wt %, or about 0.2 wt % to 10 wt %, or about 0.25 wt % to 10 wt %, or about 0.3 wt % to 10 wt %, or about 0.35 wt % to 10 wt %, or about 0.4 wt % to 10 wt %, or about 0.45 wt % to 10 wt %, or about 0.5 wt % to 10 wt %, or about 0.05 wt % to 9 wt %, or about 0.05 wt % to 8 wt %, or about 0.05 wt % to 7 wt %, or about 0.05 wt % to 6 wt %, or about 0.05 wt % to 5 wt %, or about 0.05 wt % to 4 wt %, or about 0.05 wt % to 3 wt %, or about 0.05 wt % to 2 wt %, or about 0.05 wt % to 1 wt %, or about 0.05 wt % to 0.75 wt %, or about 0.1 wt % to 5 wt %, or about 0.1 wt % to 2 wt %, or about 0.1 wt % to 1 wt %, or about 0.2 wt % to 2 wt %, or about 0.2 wt % to 1 wt %, or about 0.2 wt % to 0.75 wt %, or about 0.3 wt % to 2 wt %, or about 0.3 wt % to 1 wt %, or about 0.3 wt % to 0.75 wt %, or about 0.4 wt % to 2 wt %, or about 0.4 wt % to 1 wt %, or about 0.4 wt % to 0.75 wt % based on the weight of the crosslinking composition.

Suitable synthetic layered silicates for incorporation in the crosslinking compositions of the invention include LAPONITE® RD, sold by BYK-Gardner GmbH of Geretsried, Germany; and SUPBENT® MP, sold by FCC® Inc. of Zhejiang, China. In some embodiments, the synthetic layered silicate is a mixture of two or more different synthetic layered silicates, wherein the differences between the synthetic layered silicates are differences in chemical formulae, particle size ranges, surface area ranges, or two or more such differences.

The borate species is selected from a sparingly soluble borate, boric acid, sodium tetraborate (anhydrous) or the pentahydrate or decahydrate thereof (where the decahydrate is also referred to as "borax"), or a combination of two or more thereof. In some embodiments, the crosslinker composition includes borax but excludes a sparingly soluble borate specie. In some embodiments, the crosslinker composition includes one or more sparingly soluble borate species but excludes borax. In some embodiments, the crosslinker composition includes both one or more sparingly soluble borate species and borax. The total weight of borate species in the crosslinker composition is about 5 wt % to 65 wt %, for example about 10 wt % to 65 wt %, or about 15 wt % to 65 wt %, or about 20 wt % to 65 wt %, or about 25 wt % to 65 wt %, or about 30 wt % to 65 wt %, or about 5 wt % to 60 wt %, or about 5 wt % to 55 wt %, or about 5 wt % to 60 wt %, or about 5 wt % to 50 wt %, or about 5 wt % to 45 wt %, or about 5 wt % to 40 wt %, or about 5 wt % to 35 wt %, or about 5 wt % to 30 wt %, or about 10 wt % to 60 wt %, or about 10 wt % to 55 wt %, or about 10 wt % to 50 wt % in the crosslinker composition.

The sparingly soluble borate is a compound having the empirical formula $(AM)_a(AEM)_bB_cO_d \cdot xH_2O$ wherein a, b, c and d are integers, $0 \leq a \leq 2$, $1 \leq b \leq 4$, $2 \leq c \leq 14$, $d=[0.5a+b+1.5c]$, $0 \leq x \leq 20$, AM is an alkali metal, and AEM is an alkaline earth metal. In some embodiments, AM is Na, K, or mixtures thereof. In some embodiments, AEM is Ca, Mg, or mixtures thereof. In some embodiments, $c \geq 5$. In some embodiments, $0 \leq x \leq 15$. In some embodiments, the sparingly soluble borates are selected from the group consisting of Ulexite, Colemanite, Probertite, and mixtures thereof.

Examples of useful sparingly soluble borates include $NaCaBsO_9 \cdot 5H_2O$ (Probertite), $NaCaB_5O_9 \cdot 8H_2O$ (Ulexite), $CaB_6O_{10} \cdot 4H_2O$, $CaB_6O_{10} \cdot 5H_2O$, $Ca_2B_4O_8 \cdot 7H_2O$, $Ca_2B_6O_{11} \cdot 5H_2O$ (Colemanite), $Ca_2B_6O_{11} \cdot 7H_2O$, $Ca_2B_6O_{10} \cdot 13H_2O$, $Ca_4B_{10}O_{19} \cdot 7H_2O$, $Ca_4B_{10}O_{19} \cdot 20H_2O$, $Ca_2B_{14}O_{23} \cdot 8H_2O$, $MgB_2O_4 \cdot 3H_2O$, $MgB_2O_{13} \cdot 4H_2O$, $Mg_1B_6O_{11} \cdot 15H_2O$, $Mg_2B_6O_{11} \cdot 15H_2O$, $Mg_3B_{10}O_{18} \cdot 4\frac{1}{2}H_2O$, $CaMgB_6O_{11} \cdot 6H_2O$, $CaMgB_6O_{11} \cdot 11H_2O$, $KMg_2B_{11}O_{19} \cdot 9H_2O$, and $SrB_6O_{10} \cdot 2H_2O$. In some embodiments, the sparingly soluble borate is a mixture of two or more of the above listed sparingly soluble borates.

In embodiments, the sparingly soluble borate is included in a crosslinking composition of the invention at about 0 wt % to 65 wt % based on the weight of the crosslinking composition, for example about 5 wt % to 65 wt %, or about 10 wt % to 65 wt %, or about 15 wt % to 65 wt %, or about 20 wt % to 65 wt %, or about 25 wt % to 65 wt %, or about 30 wt % to 65 wt %, or about 35 wt % to 65 wt %, or about 40 wt % to 65 wt %, or about 45 wt % to 65 wt %, or about 50 wt % to 65 wt %, or about 55 wt % to 65 wt %, or about 5 wt % to 60 wt %, or about 5 wt % to 55 wt %, or about 5 wt % to 50 wt %, or about 5 wt % to 45 wt %, or about 5 wt % to 40 wt %, or about 5 wt % to 35 wt %, or about 5 wt % to 30 wt %, or about 10 wt % to 60 wt %, or about 10 wt % to 50 wt %, or about 20 wt % to 60 wt %, or about 20 wt % to 50 wt %, or about 30 wt % to 60 wt %, or about 30 wt % to 50 wt % based on the weight of the crosslinking composition.

Sodium tetraborate decahydrate, or "borax" is $Na_2B_4O_7 \cdot 10H_2O$, also represented as $Na_2[B_4O_5(OH)_4] \cdot 8H_2O$. In embodiments, borax is present in the crosslinking compositions of the invention at about 0 wt % to 65 wt % based on the weight of the crosslinking composition, for example about 0.5 wt % to 65 wt %, or about 1 wt % to 65 wt %, 1.5 wt % to 65 wt %, or about 2 wt % to 65 wt %, or about 3 wt % to 65 wt %, or about 4 wt % to 65 wt %, or about 5 wt % to 65 wt %, or about 6 wt % to 65 wt %, or about 7 wt % to 65 wt %, or about 8 wt % to 65 wt %, or about 9 wt % to 65 wt %, or about 10 wt % to 65 wt %, or about 15 wt % to 65 wt %, or about 20 wt % to 65 wt %, or about 25 wt % to 65 wt %, or about 30 wt % to 65 wt %, or about 35 wt % to 65 wt %, or about 40 wt % to 65 wt %, or about 45 wt % to 65 wt %, or about 50 wt % to 65 wt %, or about 55 wt % to 65 wt %, or about 5 wt % to 60 wt %, or about 5 wt % to 55 wt %, or about 5 wt % to 50 wt %, or about 5 wt % to 45 wt %, or about 5 wt % to 40 wt %, or about 5 wt % to 35 wt %, or about 5 wt % to 30 wt %, or about 10 wt % to 60 wt %, or about 0.5 wt % to 30 wt %, or about 1 wt % to 30 wt %, or about 1.5 wt % to 30 wt %, or about 2 wt % to 30 wt %, or about 2.5 wt % to 30 wt %, or about 3 wt % to 30 wt %, or about 3.5 wt % to 30 wt %, or about 4 wt % to 30 wt %, or about 4.5 wt % to 30 wt %, or about 5 wt % to 30 wt %, or about 0.5 wt % to 25 wt %, or about 0.5 wt % to 20 wt %, or about 0.5 wt % to 18 wt %, or about 0.5 wt % to 16 wt %, or about 0.5 wt % to 14 wt %, or about 0.5 wt % to 12 wt %, or about 0.5 wt % to 10 wt %, or about 0.5 wt % to 8 wt %, or about 0.5 wt % to 6 wt %, or about 0.5 wt % to 4 wt %, or about 0.5 wt % to 3 wt %, or about 0.5 wt % to 2 wt %, or about 1 wt % to 10 wt %, or about 1 wt % to 8 wt %, or about 1 wt % to 6 wt %, or about 1 wt % to 4 wt %, or about 2 wt % to 10 wt %, or about 2 wt % to 8 wt %, or about 2 wt % to 6 wt %, or about 2 wt % to 4 wt % based on the weight of the crosslinking composition.

In embodiments, the water source employed in the crosslinking compositions is any water source having a density of about 998 $kg/m^3$ to 1200 $kg/m^3$ at 20° C., wherein 998.2071 $kg/m^3$ is reported as the density of pure water at 20° C. (Source: Lide, D. R. (Ed.) CRC Handbook of Chemistry and Physics (87th Ed.) 2006-2007, CRC Press, Boca Raton, Fla.). While water sources having a density greater than about 998 $kg/m^3$ at 20° C. may be usefully employed in the crosslinking compositions, it is an advantage of the invention that the use of water sources having a density greater than about 998 $kg/m^3$ at 20° C. is not required to provide shelf stability of the crosslinker compositions. Saturated salt or borate solutions, for example, are not required in order to provide the shelf stable crosslinker compositions of the invention. Water sources such as municipal or tap water are suitably employed as water sources in the crosslinking compositions of the invention. Thus, in embodiments, a water source employed in the crosslinking compositions of the invention has a density of about 998 to 1200 $kg/m^3$ at 20° C., or about 998 $kg/m^3$ to 1150 $kg/m^3$, or about 998 $kg/m^3$ to 1100 $kg/m^3$, or about 998 $kg/m^3$ to 1050 $kg/m^3$, or about 998 $kg/m^3$ to 1000 $kg/m^3$ at 20° C.

In embodiments the water source is employed in a crosslinker composition of the invention at about 30 wt % to 80 wt % based on the total weight of the crosslinker composition, for example about 32 wt % to 80 wt %, or about 34 wt % to 80 wt %, or about 36 wt % to 80 wt %, or about 38 wt % to 80 wt %, or about 40 wt % to 80 wt %, or 42 wt % to 80 wt %, or about 44 wt % to 80 wt %, or about 46 wt % to 80 wt %, or about 48 wt % to 80 wt %, or about 50 wt % to 80 wt %, or about 52 wt % to 80 wt %, or about 54 wt % to 80 wt %, or about 56 wt % to 80 wt %, or about 58 wt % to 80 wt %, or about 60 wt % to 80 wt %, or about 30 wt % to 78 wt %, or about 30 wt % to 76 wt %, or about 30 wt % to 74 wt %, or about 30 wt % to 72 wt %, or about 30 wt % to 70 wt %, or about 30 wt % to 68 wt %, or about 30 wt % to 66 wt %, or about 30 wt % to 64 wt %, or about 30 wt % to 62 wt %, or about 30 wt % to 60 wt %, or about 35 wt % to 58 wt %, or about 35 wt % to 56 wt %, or about 35 wt % to 54 wt %, or about 35 wt % to 52 wt %, or about 35 wt % to 50 wt %, or about 40 wt % to 70 wt %, or about 40 wt % to 60 wt % based on the total weight of the crosslinker composition.

Table 1 shows representative ratios of components of the crosslinker compositions of the invention. In some embodiments, the crosslinker compositions comprise, consist essentially of, or consist of the components and amounts listed in Table 1 as weight percentages of the components. In other embodiments, the crosslinker compositions comprise, consist essentially of, or consist of the components listed in Table 1 and one or more additional components, wherein the components listed in Table 1 indicate the ratio of those components. In embodiments, a suitable range of wt % in the crosslinker composition for a selected component is represented by selecting any two values from Table 1 for that component. Thus, for example, borax is present in some crosslinker compositions of the invention at about 4 wt % to 8 wt %, or about 15 wt % to 30 wt %, and so forth with regard to the listed components of Table 1; or is present in the indicated range of ratios in a composition including additional components.

TABLE 1

Representative component ratios of crosslinker compositions of the invention.

| Component | Composition | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Sparingly Sol. Borate | 0 | 20 | 40 | 0 | 30 | 15 | 40 | 65 | 5 | 0 | 45 | 0 |
| Borax | 15 | 30 | 0 | 65 | 20 | 8 | 4 | 0 | 45 | 60 | 0 | 30 |
| Synthetic layered silicate | 5 | 1.5 | 10 | 0.5 | 0.7 | 4 | 1 | 0.1 | 0.5 | 0.3 | 0.5 | 2 |
| Water source | 80 | 48.5 | 50 | 34.5 | 49.3 | 73 | 55 | 34.9 | 49.5 | 39.7 | 54.5 | 68 |

The pH of the crosslinker compositions suitably ranges from about 2 to 14. In embodiments, one or more pH adjustment agents are added in an amount to provide shelf stability of the crosslinker compositions. For example, at a pH of about 8 or greater, the sparingly soluble borate component begins to form reactive species and dissolve. Thus, in some embodiments the pH of the crosslinker compositions is maintained at less than about 8 prior to the point in time when the crosslinker composition is combined with the hydroxyl functional polymer to yield an injectable composition, wherein the crosslinking reaction initiated by the reactive species is desirably triggered. In embodiments, no additional components are added to the crosslinker compositions; in other embodiments, a pH adjustment agent is added to provide a pH of between 2 and 14 wherein the value is selected by the end user. The pH adjustment agents employed in some embodiments of the crosslinker compositions of the invention include, but are not limited to, any compound that at least partially dissociates in water to generate hydronium or hydroxyl ions, i.e. Brønsted acids and bases, as well as conjugate bases of Brønsted acids and buffer compositions targeting a selected pH. The type of pH adjustment agent is not otherwise limited and includes both weak and strong acids and bases as well as combinations of two or more pH adjustment agents. Nonlimiting examples of useful pH adjustment agents include strong acids (completely dissociating) such as HCl, strong bases such as NaOH, and buffer compositions directed to providing a selected pH when added to the crosslinker compositions. Combinations of two or more pH adjustment agents are also suitably employed to adjust the pH of the crosslinker compositions of the invention.

Optionally, one or more additional components are added to the crosslinker compositions of the invention. For example, freezing point depressants, surfactants, gel stabilizing agents, salts, suspension stabilizing agents, additional boron-containing compounds, biocides, buffer compounds and pH modifiers, and/or natural clay materials are advantageously employed in the crosslinker compositions of the invention. Any one or more of any of these additional components and combinations of two or more thereof are employed in the crosslinker compositions of the invention as discussed below.

Freezing point depressants optionally employed in the crosslinker compositions of the invention include, but are not limited to, organic alcohols including sugar alcohols, glycols and glycol ethers or combinations of two or more thereof that are soluble in water. Examples of useful freezing point depressants include methanol, ethanol, isopropanol, ethylene glycol, diethylene glycol, polyethylene glycol, glycerol, and the like as well as combinations of two or more such compounds. Freezing point depressants are useful in the crosslinker compositions of the invention in cases where temperatures near, at, or below 0° C. are encountered by the compositions during e.g. storage\ or dilution in the field as well as during injection into one or more hydraulic fracturing reservoirs. The freezing point depressants are included in the compositions of the invention at 0 wt % to 20 wt % based on the total weight of the crosslinker composition. Glycerol is environmentally friendly and is used in some embodiments as an effective freezing point depressant for the crosslinker compositions at about 5 wt % to 10 wt % of the composition.

Surfactants optionally employed in the crosslinker compositions of the invention include, but are not limited to, any water soluble surfactant that is substantially inert in the crosslinker compositions and combinations of two or more thereof. Types of useful surfactants are not particularly limited and include anionic, cationic, nonionic, and zwitterionic surfactants and combinations of two more surfactant compounds. While not limited thereto, useful surfactants have an HLB of at least about 10. Surfactants are included in the crosslinker compositions of the invention at 0 wt % to 10 wt % based on the total weight of the crosslinker composition. Surfactants are particularly useful in the crosslinker compositions of the invention to ameliorate incompatibility of two or more other components of the crosslinker compositions wherein the incompatibility results in phase separation, for example of two incompatible liquids, over time.

Gel stabilizing agents are optionally added to the crosslinker formulation to prevent premature viscosity degradation due to oxidation. Suitable gel stabilizing agents include sodium thiosulfate, weak organic acids such as ascorbic acid, citric acid, and uric acid, oximes, toluene derivatives such as BHT, BHA, and 4-tert-butylcatechol, hydroquinone, methoxyhydroquinone, carbohydrazide, diethylhydroxyamine, 4-hydroxy-2,2,6,6-tetramethylpiperidine 1-oxyl, phosphites such as sodium hypophosphite, phenylenediamine derivatives, and phenothiazine as well as combinations of two or more thereof. Gel stabilizing agents are employed in the crosslinker compositions of the invention at 0 wt % to 20 wt % based on the total weight of the crosslinker composition.

Suspension stabilizing agents optionally employed in the crosslinker compositions of the invention include materials that decrease the API yield point of the compositions, generally known in the art as deflocculants or "thinners", preferably alkaline earth metal tolerant compounds, and combinations of two or more such agents. Useful stabilizing agents include tannins and tannin derivatives, lignosulfonates, and synthetic polymeric compounds. The synthetic polymeric compounds are generally low molecular weight polymers or copolymers of various acrylic, acrylate, methacrylic, methacrylate, acrylamide, methacrylamide, vinyl sulfonate, N-vinyl lactam, 2-acrylamido-2-methylpropane sulfonic acid and the like polymerizable monomers. Examples of useful stabilizing agents are found in Chen et al. U.S. Pat. No. 4,521,578; Portnoy U.S. Pat. No. 4,680,128; Matz et al. U.S. Pat. No. 5,032,295; Bloys et al. U.S. Pat. No. 5,292,367; and Stahl et al. U.S. Pat. No. 6,030,928. Particularly preferred are the calcium tolerant copolymers set forth in Giddings et al. U.S. Pat. No. 4,770,795, incorporated herein by reference in its entirety. Stabilizing agents are included in the crosslinker compositions of the invention at 0 wt % to 5 wt % based on the total weight of the crosslinker composition.

Salts optionally employed in the crosslinker compositions of the invention include, but are not limited to, water soluble inorganic ionic compounds that increase the density of the crosslinker composition, affect the pH sensitivity of the crosslinking reaction, or a combination thereof. The type of salt is not particularly limited and includes compounds such as sodium chloride, potassium chloride, potassium formate, sodium formate, and the like as well as combinations of two or more such compounds. Salts are employed in the crosslinker compositions of the invention at 0 wt % to 20 wt % based on the total weight of the crosslinker composition.

Additional boron-based compounds include usefully employed in the crosslinker compositions of the invention include, but are not limited to, boric acid, sodium borate, disodium tetraborate, sodium metaborate, amino boric acid, and combinations thereof. Boron-based compounds are included in the crosslinker compositions of the invention at 0 wt % to 30 wt % based on the weight of the composition. In embodiments, the additional boron based compounds are added to the crosslinker compositions to control crosslinking time and rheological performance. In some embodiments where the boron-based compound is boric acid, the crosslinker compositions are pH adjusted to neutral after the addition, that is to a pH of at least about 7.

Biocides include usefully employed in the crosslinker compositions of the invention include, but are not limited to, water soluble compounds that are substantially inert in the crosslinker compositions but have antimicrobial activity. Thus, biocides are added to the crosslinker compositions to prevent growth of microorganisms within the crosslinker compositions during storage and transportation thereof. The type of biocide is not particularly limited. While not limited thereto, useful biocides include glutaraldehyde, quaternary ammonium salts such as ammonium chloride, 2,2-dibromo-3-nitrilopropionamide, and tetrakis(hydroxymethyl) phosphonium sulfate. Biocides are included in the crosslinker compositions of the invention at 0 wt % to 3 wt % based on the weight of the composition.

Natural clay materials are defined as non-synthetic phyllosilicates and blends of two or more thereof, optionally including non-phyllosilicates as a byproduct of the environment from which the natural clay is obtained. Natural clay materials include montmorillonite, kaolinite, vermiculite, bentonite, sepiolite, saponite, nontronite, beidellite, fuller's earth, attapulgite (palygorskite), or combinations thereof. Natural clay materials include, in some embodiments, aluminum content, calcium content, or both. Natural clay materials are included in the crosslinker compositions of the invention at 0 wt % to 10 wt % based on the weight of the composition. Natural clay materials are useful for adjusting the rheology of the crosslinker compositions to meet the requirements of individual users.

The crosslinker compositions are characterized by several unexpected and advantageous properties when compared to conventional aqueous borate crosslinker blends used to crosslink hydroxylated polymers in hydraulic fracturing fluids.

The crosslinker compositions are characterized by unique rheological properties compared to conventional aqueous borate crosslinker blends. In embodiments, the crosslinker compositions are characterized as Bingham plastics. Thus, when stress is applied the crosslinker compositions do not flow until the yield stress is reached. Beyond this point the flow rate increases steadily with increasing shear stress. The yield stress of the compositions is about 4 Pa to 10 Pa when measured at common ambient temperatures (about 20° C.) under low-shear conditions, such as at 3 rpm using a FANN® Model 35 viscometer (obtained from FANN® Instrument Company of Houston, Tex.). Thus, until the composition is stressed, for example by shaking or pouring or another source of shear stress, the composition tends to act as a solid, that is, it does not flow. This range of yield stress provides the crosslinker compositions with the ability to remain solid-like while at rest, but provides a low threshold of force required to move the composition as a liquid, for example when it is pumped into a holding tank, a mixing device, and the like.

This property is highly advantageous in the context of shelf stability of the crosslinker compositions: the composition behaves as a solid when undisturbed, so the sparingly soluble borate is prevented from settling, for example during storage and transportation of the product to the use site, e.g. from the manufacturing facility to a hydraulically fractured reservoir. The sparingly soluble borate, which is a particulate material suspended within the crosslinker compositions, has a density of greater than 1000 kg/m$^3$, for example up to 2000 kg/m$^3$. Thus, in an aqueous suspension, the sparingly soluble borate has a tendency to settle over time due to having a substantially higher density than pure water. Efforts to maintain a relatively homogeneous aqueous borate crosslinker blend, that is, a shelf stable conventional aqueous borate crosslinker blend, have previously failed due to this tendency.

One previously disclosed approach to the settling problem is to try to match the density of the aqueous carrier to that of the borate species. Thus, some conventional aqueous borate crosslinker blends include appreciable salt content for the purpose of increasing the density of the aqueous phase of the blends, thereby slowing the settling of the borate species. Other approaches include the use of a saturated borate solution to stabilize the aqueous phase and prevent settling. These approaches have met with only partial success. Sedimentation of 6% or more still occurs in the conventional aqueous borate crosslinker blends within about 3 days. Thus, when the conventional aqueous borate crosslinker blends are allowed to sit undisturbed on a shelf, or during transportation, or at any other time between manufacture and mixing with an hydroxyl functional polymer to form an injectable blend, the conventional aqueous borate crosslinker blends undergo substantial settling. This tendency to settle translates to heterogeneity of the composition within the storage vessel, necessitating mixing immediately prior to use. More importantly, the tendency of the conventional aqueous borate crosslinker blends to settle means that particulate borates have a tendency to settle and collect at the bottom of the holding tanks employed in the field to mix the crosslinker with an hydroxyl functional polymer during formation of injectable blends. Such settling can be highly deleterious for the operation of the equipment employed to transfer the crosslinker from the holding tank to the mixing device employed to mix the crosslinker with an hydroxyl functional polymer during formation of injectable blends.

Additionally, settling of the particulate in a holding tank can cause an imbalance of the sparingly soluble borate concentration during the mixing of the crosslinker with the hydroxyl functional polymer during formation of injectable blends, which in turn deleteriously affects the crosslinking chemistry in terms of stoichiometry. Depending on the relative concentration of hydroxyl functional polymer and borate anion, the crosslinking reaction may produce useful gels, or may lead to insolubilization, precipitation, or unstable, non-useful gels. The viscosity of the hydrated polymer solution increases with an increase in the concentration of borate anion until a maximum is obtained. Thereafter the viscosity decreases and the gel becomes unstable as evidenced by a lumpy, inhomogeneous appearance and syneresis. Therefore, maintenance of a substantially homogeneous distribution of the sparingly soluble borate in the field is of critical importance in obtaining a consistent injectable blend having the targeted viscosity and characterized by the absence of products due to off-target stoichiometry.

Advantageously, the crosslinker compositions of the invention are shelf stable and undergo about 5% sedimentation or less after about 72 hours to 120 days undisturbed at 20° C., when measured by light backscattering. For example, the crosslinker compositions of the invention undergo about 5% or less sedimentation after about 72 hours to 100 days, or about 72 hours to 80 days, or about 72 hours to 60 days, or about 72 hours to 40 days, or about 72 hours to 20 days, or about 72 hours to 10 days, or about 72 hours to 9 days, or about 72 hours to 8 days, or about 72 hours to 7 days, or about 72 hours to 6 days, or about 72 hours to 5 days, or about 72 hours to 4 days. In some embodiments, the crosslinker compositions undergo about 5% sedimentation or less after 72 hours undisturbed at 20° C., when measured by light backscattering, or about 5% to 0% (where 0% represents no measurable sedimentation), or about 4.5% to 0%, or about 4% to 0%, or about 3.5% to 0%, or about 3% to 0%, or about 2.5% to 0%, or about 2% to 0%, or about 1.5% to 0%, or about 1% to 0%, or about 0.5% to 0%, or about 0.25% to 0%, or about 0.1% to 0%, or about 5% to 0.1%, or about 5% to 0.25%, or about 5% to 0.5%, or about 5% to 1%, or about 5% to 1.5%, or about 5% to 2%, or about 5% to 2.5%, or about 5% to 3% sedimentation or less after 72 hours undisturbed at 20° C., when measured by light backscattering.

While it is acceptable to do so, it is not necessary to add salt to the water source or the crosslinker compositions in order to maintain a substantially homogeneous dispersion. Without wishing to be limited by theory, we believe that the rheological characteristics imparted by the use of the synthetic layered silicates employed in the crosslinker compositions of the invention are responsible for the shelf stability of the compositions. The crosslinker compositions behave as non-flowing solids until shear force is applied to exceed the yield point. Thus, the solid suspended particles of sparingly soluble borate tend to remain suspended when the composition is at rest.

In some embodiments, the yield point of the crosslinker compositions is measured at common ambient temperatures (about 20° C.) under low-shear conditions, such as at 3 rpm using a FANN® Model 35 viscometer (obtained from FANN® Instrument Company of Houston, Tex.). Using such methods, the yield point of the crosslinker compositions is about 4 Pa to 10 Pa, or about 5 Pa to 10 Pa, or about 6 Pa to 10 Pa, or about 4 Pa to 9 Pa, or about 4 Pa to 8 Pa, or about 4 Pa to 7 Pa, or about 5 Pa to 7 Pa.

The crosslinker compositions are characterized as having a high gel strength. Gel strength is a measure of the ability of a fluid to suspend solid particles while it is in static condition (in the absence of shear or other force). To test gel strength, a fluid is agitated in the FANN® viscometer at 300 rpm for 5 seconds at about 20° C., then shear is stopped for a selected period of time (10 seconds, 10 minutes, 30 minutes and so on) before measuring the viscosity at 3 rpm. Using such measurement techniques, gel strength of the crosslinker compositions is about 8 cP to 25 cP, for example about 8 cP to 24 cP, or about 8 cP to 23 cP, or about 8 cP to 22 cP, or about 8 cP to 21 cP, or about 8 cP to 20 cP, or about 8 cP to 19 cP, or about 8 cP to 18 cP, or about 8 cP to 17 cP, or about 8 cP to 16 cP, or about 8 cP to 15 cP, or about 8 cP to 14 cP, or about 8 cP to 13 cP, or about 9 cP to 25 cP, or about 10 cP to 25 cP, or about 11 cP to 25 cP, or about 12 cP to 25 cP, or about 13 cP to 25 cP, or about 10 cP to 20 cP, or about 10 cP to 18 cP, or about 10 cP to 16 cP, or about 10 cP to 14 cP. In sharp contrast, conventional crosslinker compositions—even when natural clay materials are added—have measured gel strength under the same conditions of about 1 cP to 3 cP.

In some embodiments, crosslinker compositions stressed beyond the yield point are shear thinning, undergoing a reduction in viscosity as a function of increasing shear once the yield point is surpassed. Shear thinning is an effect where a fluid's viscosity—the measure of a fluid's resistance to flow-decreases with increasing rate of shear strain. Shear thinning is a highly advantageous property for the crosslinking compositions because by subjecting a crosslinking composition to shear force in excess of the yield point, the composition is readily pumped to and placed in a holding tank or a mixing device for mixing with a polymer solution to form an injectable composition. Alternatively, the composition is readily pumped to and placed in a subterranean zone. Thus, the combined rheological characteristics of yield point and shear thinning are highly advantageous for deploying and mixing the crosslinker compositions.

In embodiments, the crosslinker compositions are strongly shear thinning. For example, in some embodiments where measurements are made at about 20° C., the crosslinker compositions exhibit greater than 70% drop in measured viscosity between a shear rate of 0 and 100 rpm, for example about a 70% to 95% drop, or about 75% to 95% drop, or about an 80% to 95% drop, or about an 85% to 95% drop in viscosity between a shear rate of 0 and 100 rpm. Thus, once stressed beyond the yield point, the compositions of the invention are strongly shear thinning. This property is highly advantageous for allowing for easy transfer and movement of the composition, such as through a mixing device, a pump, or the like.

In some embodiments, the crosslinker compositions are thixotropic. Thus, where the compositions are subjected to force in excess of the yield point, the shear thinning composition recovers its initial viscosity within about 1 minute to 120 minutes after cessation of shear, for example about 1 minute to 110 minutes, or about 1 minute to 100 minutes, or about 1 minute to 90 minutes, or about 1 minute to 80 minutes, or about 1 minute to 70 minutes, or about 1 minute to 60 minutes, or about 1 minute to 50 minutes, or about 1 minute to 40 minutes, or about 1 minute to 30 minutes, or about 1 minute to 20 minutes, or about 1 minute to 10 minutes, or about 2 minutes to 120 minutes, or about 3 minutes to 120 minutes, or about 4 minutes to 120 minutes, or about 5 minutes to 120 minutes, or about 6 minutes to 120 minutes, or about 7 minutes to 120 minutes, or about 8 minutes to 120 minutes, or about 9 minutes to 120 minutes, or about 10 minutes to 120 minutes, or about 15 minutes to 120 minutes, or about 20 minutes to 120 minutes, or about 25 minutes to 120 minutes, or about 30 minutes to 120 minutes, or about 5 minutes to 100 minutes, or about 5 minutes to 50 minutes, or about 5 minutes to 40 minutes, or about 5 minutes to 30 minutes, or about 5 minutes to 20 minutes after cessation of shear forces on the crosslinker compositions.

Another advantage of the crosslinker compositions of the invention is that they do not require salts or other materials to increase the density of the aqueous phase. This is because shelf stability of the compositions is imparted by the combined rheological properties of yield point (shelf stability at rest) and thixotropic behavior (rapid recovery of solid-like behavior once any force applied to the compositions is ceased). Thus, density-matching of the water source to the sparingly soluble borate particulate is not necessary, although addition of salts etc. to the compositions is not precluded. Thus the crosslinker compositions are formed with relative ease, since a density matching step is eliminated. Further, since the density of the water source can be e.g. about 1000 kg/m$^3$, the overall crosslinker compositions are lighter per unit volume than conventional crosslinker compositions that employ salt to densify the aqueous phase. This translates to efficiencies in transportation and the ability to easily move and manipulate the compositions in the field. Where tap water is used as the water source, for example, the density of the water source is about 998 kg/m$^3$ to about 1050 kg/m$^3$.

Yet another advantage of the crosslinker compositions of the invention is that the synthetic layered silicate is a man-made compound, and therefore is characterized as having a highly uniform chemical formula. Natural clay or mineral materials have a chemical makeup that changes with each batch, region, etc. where the natural products are recovered. However, in the case of the crosslinker compositions it is highly advantageous to employ materials having a substantially uniform chemical composition. This leads to greater efficiency in manufacturing the crosslinker compositions than could be realized by the use of a natural clay product such as e.g. montmorillonite. Variation in such natural products translates to variability in rheological characteristics. In a manufacturing environment this translates to lack of reproducibility and time spent getting to the right physical properties by adding more clay, adding more water, etc. The use of synthetic layered silicate ameliorates this variability. Thus, reproducible physical properties are advantageously imparted to the crosslinker compositions by the use of a synthetic layered silicate.

Yet another advantage of the crosslinker compositions of the invention is that they are easy to make and employ conventional mixing and blending equipment familiar to one of skill. In embodiments, the crosslinker compositions are formed by steps comprising, consisting essentially of, or consisting of adding the components to water with mixing between addition of each component. In some embodiments, the crosslinker compositions are formed by steps comprising, consisting essentially of, or consisting of adding the synthetic layered silicate to water, followed by agitation or mixing; adding borax, followed by agitation or mixing; and adding the sparingly soluble borate, followed by agitation or mixing.

Use of the Crosslinker Compositions

The crosslinker compositions of the invention are advantageously employed to crosslink one or more hydroxyl functional polymers according to known methods to yield injectable compositions for hydraulic fracturing. Hydraulic fracturing using the crosslinking compositions involves adding the crosslinker composition to a solution of a water soluble borate-crosslinkable polymer at a rate of about 1-2 parts of the crosslinker composition per thousand by weight, to create a viscous fluid that is capable of transporting proppant (sand or another particulate) into the fractures. This fluid is then injected into a well at a rate of about 40-100 barrels per minute (6.36 m$^3$/min to 15.90 m$^3$/min) to initiate and extend the fracture. Useful hydroxyl functional polymers include both naturally sourced and synthetic polymers such as guar gum, locust bean gum, dextran, polyvinyl alcohol, and derivatives of these polymers or blends of two or more thereof. In some embodiments, guar gum is employed as the hydroxyl functional polymer. In some embodiments, the polymer derivative is a carboxylated polymer, such as a carboxylate functional guar, a carboxylate functional copolymer or derivative of polyvinyl alcohol, and the like. In some embodiments, the polymer derivative is hydroxyalkyl functionalized, for example hydroxypropyl guar.

In embodiments, the hydroxyl functional polymer is employed in an aqueous polymer solution, and the aqueous polymer solution is contacted with the crosslinker composition of the invention to form an injectable composition. The aqueous polymer solution comprises, or consists essentially of about 0.01 wt % to 5 wt % of an hydroxyl functional polymer based on the weight of the aqueous polymer solution, for example about 0.05 wt % to 5 wt %, or about 0.1 wt % to 5 wt %, or about 0.15 wt % to 5 wt %, or about 0.2 wt % to 5 wt %, or about 0.25 wt % to 5 wt %, or about 0.3 wt % to 5 wt %, or about 0.01 wt % to 4.5 wt %, or about 0.01 wt % to 4 wt %, or about 0.01 wt % to 3.5 wt %, or about 0.01 wt % to 3 wt %, or about 0.01 wt % to 2.5 wt %, or about 0.01 wt % to 2 wt %, or about 0.01 wt % to 1.5 wt %, or about 0.01 wt % to 1 wt %, or about 0.01 wt % to 0.9 wt %, or about 0.01 wt % to 0.8 wt %, or about 0.01 wt % to 0.7 wt %, or about 0.01 wt % to 0.6 wt %, or about 0.01 wt % to 0.5 wt %, or about 0.01 wt % to 0.4 wt %, or about 0.01 wt % to 0.3 wt %, or about 0.1 wt % to 1 wt %, or about 0.1 wt % to 0.5 wt % hydroxyl functional polymer based on the weight of the aqueous polymer solution.

In some embodiments, the aqueous polymer solution further includes one or more additional components. Examples of such additional components include proppants, friction-reducing polymers, biocides, scale inhibitors, iron chelators, clay stabilizers, flowback aids, non-emulsifiers, enzymes, oxidative breakers, paraffin control agents, surfactants, solvents, and combinations thereof as will be recognized by one of skill.

In embodiments, the aqueous polymer solution is adjusted to have a pH of about 8 or greater prior to contact of the aqueous polymer solution with the crosslinker composition. A pH of at least about 8 is required to initiate the crosslinking reaction of borate anions with the hydroxyl functional polymer. Thus, in embodiments, an aqueous polymer solution is adjusted to a pH that is designed to provide a pH of at least about 8 upon contacting the aqueous polymer solution with a crosslinker composition. Thus, for example, the aqueous polymer solution is adjusted to have a pH of about 8 to 13, or about 8.5 to 13, or about 9 to 13, or about 9.5 to 13, or about 10 to 13, or about 10.5 to 13, or about 11 to 13, or about 8 to 12.5, or about 8 to 12, or about 8 to 11.5, or about 8 to 11, or about 9 to 12, or about 10 to 12. Agents useful to produce the targeted pH are any of the conventional acids, bases, and buffer systems familiar to those of skill, further including the pH adjustment agents listed above. Suitable agents include, for example, sodium hydroxide, sodium bicarbonate, potassium hydroxide, and potassium carbonate.

In embodiments, the crosslinker compositions are combined with the aqueous polymer solution at a ratio of about 1:100 to 1:5000 vol:vol crosslinker composition:aqueous polymer solution, for example about 1:200 to 1:5000, or about 1:300 to 1:5000, or about 1:400 to 1:5000, or about 1:500 to 1:5000, or about 1:600 to 1:5000, or about 1:700 to 1:5000, or about 1:800 to 1:5000, or about 1:900 to 1:5000, or about 1:1000 to 1:5000, or about 1:100 to 1:4000, or about 1:100 to 1:3000, or about 1:100 to 1:2500, or about 1:100 to 1:2400, or about 1:100 to 1:2300, or about 1:100 to 1:2200, or about 1:100 to 1:2100, or about 1:100 to 1:2000, or about 1:100 to 1:1900, or about 1:100 to 1:1800, or about 1:100 to 1:1700, or about 1:100 to 1:1600, or about 1:100 to 1:1500, or about 1:100 to 1:1400, or about 1:100 to 1:1300, or about 1:100 to 1:1200, or about 1:100 to 1:1100, or about 1:100 to 1:1000, or about 1:200 to 1:2000, or about 1:500 to 1:2000, or about 1:500 to 1:2000, or about 1:500 to 1:1000 vol:vol with an aqueous polymer dispersion of an hydroxyl functional polymer.

When the aqueous polymer solution contacts the crosslinker composition, the injectable composition that forms comprises a pH of 8 or greater, and the crosslinking reaction is initiated. The borate crosslinking reaction is known by those of skill to be time delayed due to the need for the sparingly soluble borate particulates to dissolve and make available the anionic species necessary to achieve the crosslinking reaction. A higher targeted pH translates to faster crosslinking, thus the pH of the injectable composition is selected to conform to the particular requirements of an end user and the equipment used, e.g. rate of injection. In some embodiments, the crosslinking reaction is completed in about 30 seconds to 15 minutes, for example about 45 seconds to 15 minutes, or about 1 minute to 15 minutes, or about 2 minutes to 15 minutes, or about 3 minutes to 15 minutes, or about 30 seconds to 13 minutes, or about 30 seconds to 11 minutes, or about 30 seconds to 9 minutes, or about 30 seconds to 7 minutes, or about 30 seconds to 5 minutes, or about 30 seconds to 3 minutes, or about 1 minute to 10 minutes, or about 1 minute to 5 minutes, or about 1 minute to 3 minutes.

No special equipment is required to form the injectable compositions; any mixing equipment suitably employed to mix viscous solutions of polymers and particulate dispersions is usefully employed to mix the crosslinker compositions with the aqueous polymer solutions to form injectable compositions by adjusting the feed or mixing ratio of the two components of the injectable composition as selected by the user.

In some embodiments, the injectable compositions are injected into one or more hydraulic fracturing reservoirs to recover one or more hydrocarbons therefrom. One of skill will recognize that the injectable compositions have properties commensurate with hydroxyl-functional polymers subjected to boron-crosslinking conditions, including rheology and crosslinking time. Thus, a crosslinker composition is combined with an aqueous solution of an hydroxyl-functional polymer at a ratio of about 1:100 to 1:5000 vol:vol crosslinker composition:aqueous polymer solution to form an injectable composition having a pH of about 8 to 14.

The injectable compositions are injected into one or more hydraulic fracturing reservoirs, often at surface pressures between 5,000 and 10,000 psi, creating and extending fractures in the subterranean rock via a wellbore. A proppant, such as natural sand, silica, bauxite, a ceramic material, a resin-coated sand, or a combination of two or more thereof is typically added to the injectable composition at a rate of about 0.01 kg/liter to 1.5 kg/liter, for example about 0.03 kg/liter to 1.2 kg/liter or 0.05 kg/liter to 1 kg/liter of the injectable composition before the injectable composition enters the wellhead. The injectable composition carries the proppant through the wellbore and into the fractures, suspending it until pumping is ceased or slowed and the pressure is decreased, causing the fracture to close in on the proppant pack, which holds the fracture open and creates a permeable pathway for hydrocarbons to migrate out of the formation and into the wellbore. In this manner, hydrocarbon compounds are recovered from the one or more subterranean reservoirs.

EXPERIMENTAL

Example 1

A crosslinker composition was formed by adding 108.88 g of tap water to a beaker equipped with a mechanical paddle type stirrer. Stirring was commenced at 600-800 rpm, and this rate of stirring was continued during the following additions and mixing periods. First, 1.12 g LAPONITE® RD (obtained from BYK-Gardner GmbH of Geretsried, Germany) was added to the water; the mixture was stirred for about 30 minutes after the addition. Then, 7 g sodium tetraborate decahydrate (borax) was added; once mixed thoroughly, 81 g Ulexite (325 mesh, obtained from PAN Asian Chemical, Inc. of Houston, Tex.) was also added. The mixture was stirred for an additional 10 minutes after addition of Ulexite.

The crosslinker composition was subjected to rheological testing at about 20° C. using a FANN® Model 35 viscometer (obtained from FANN® Instrument Company of Houston, Tex.). Plastic viscosity (PV, cP), yield point (YP) were measured at 600 rpm and 3 rpm. PV is derived by subtracting the reading measured at 300 rpm from the reading measured at 600 rpm. PV was found to be 10 cP. YP is the resistance to initial flow, or the stress required starting fluid movement. YP is calculated by subtracting the PV from the 300 rpm reading. YP at low shear is calculated by substracting PV from the reading at 3 rpm. At 600 rpm, the YP was found to 13 Pa. At 3 rpm, the YP was found to be 6 Pa.

Gel strength (GS) was also measured. GS is a measure of the ability of a fluid to suspend solid particles while it is in static condition (in the absence of shear or other force applied to the fluid). To test gel strength, a fluid is agitated in the FANN® viscometer at 300 rpm for 5 seconds at about 20° C., then shear is stopped for a selected period of time (10 seconds, 10 minutes, 30 minutes and so on) before measuring the viscosity at 3 rpm. GS is reported as peak viscosity, wherein higher viscosity translates to higher gel strength.

Table 2 shows GS of the fluid after remaining undisturbed for various periods of time. Peak GS of 12-13 cP is reached after remaining undisturbed for about 10 minutes or less.

Figure 1B:
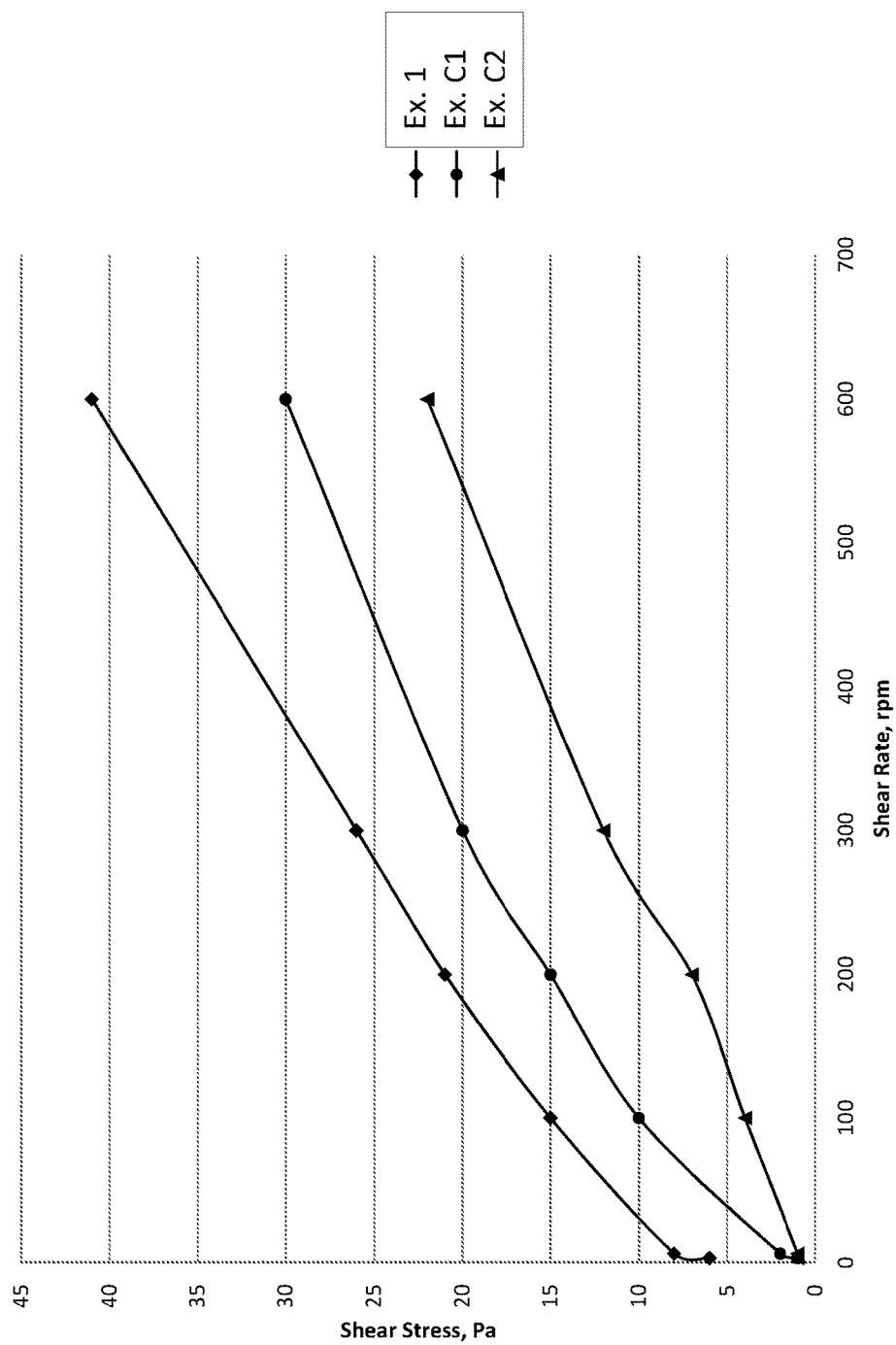
FIG. 1B is a plot showing shear stress as a function of shear rate at 20° C. for the compositions tested in FIG. 1A.

A measurement of viscosity and shear stress as a function of shear rate was also conducted on the rheometer at 20° C. FIG. 1A shows a plot of the viscosity, in cP, as a function of shear rate. FIG. 1B shows a plot of the shear stress as a function of shear rate. FIG. 1B clearly shows the yield stress of greater than 5 Pa.

Example C1

A crosslinker composition was formed according to the procedure of Example 1, but using bentonite clay (EC-CAGEL® OCMA, obtained from Imerys Oilfield Solutions of The Woodlands, Tex.) in place of LAPONITE® RD. PV was measured to be 10 cP. YP at 300 rpm was determined to be 10 Pa. YP at 3 rpm was determined to be 0. GS of the fluid after remaining undisturbed for various periods of time is 1 cP, as shown in Table 2.

A measurement of viscosity and shear stress as a function of shear rate was also conducted on the rheometer at 20° C. FIG. 1A shows a plot of the viscosity, in cP, as a function of shear rate. FIG. 1B shows a plot of the shear stress as a function of shear rate.

Example C2

A crosslinker composition was formed according to the procedure of Example 1, but using sepiolite clay (obtained from Sigma-Aldrich Company of St. Louis, Mo.) in place of LAPONITE® RD. PV was measured to be 10 cP. YP at 300 rpm was determined to be 12 Pa. YP at 3 rpm was determined to be 1 Pa. GS of the fluid after remaining undisturbed for various periods of time is 1 cP, as shown in Table 2.

A measurement of viscosity and shear stress as a function of shear rate was also conducted on the rheometer at 20° C. FIG. 1A shows a plot of the viscosity, in cP, as a function of shear rate. FIG. 1B shows a plot of the shear stress as a function of shear rate.

TABLE 2

Gel strength as a function of time undisturbed for the crosslinker compositions of Ex. 1, C1, and C2.

| Crosslinker Composition | Gel Strength, cP, after indicated time | | | | | |
|---|---|---|---|---|---|---|
| | 10 sec | 10 min | 30 min | 1 hr | 3 hr | 20 hr |
| Ex. 1 | 5 | 12 | 12 | 12 | 13 | 13 |
| Ex. C1 | 0 | 1 | 1 | 1 | 1 | 1 |
| Ex. C2 | 1 | 1 | 1 | 1 | 1 | 1 |

Example 2

A solution of 0.3 wt % guar gum (POLYFRAC® Plus, obtained from PfP Technology of Houston, Tex.) was added to tap water while stirring at 1500 rpm using an overhead paddle type mixer. Mixing was continued for an additional 10 minutes after the addition. Then the pH of the polymer solution was adjusted to 11 using a 20% solution of NaOH. Then 500 mL of the polymer solution was added to a beaker equipped with a mechanical paddle type stirrer. The stirrer was adjusted to 1500 rpm. A vortex was observed to form and stabilize. A syringe was loaded with 0.5 mL of the crosslinker composition of Example 1, and the contents of the syringe were injected on the side of the vortex in a single injection. Upon completing the injection, a timer was started. The timer was stopped at the point when the vortex was observed to disappear and no signs of mixing were observed on the surface of the mixture. The time elapsed is denoted as "crosslink time." Crosslink time was recorded as 3 minutes, 10 seconds.

Example 3

Figure 2:
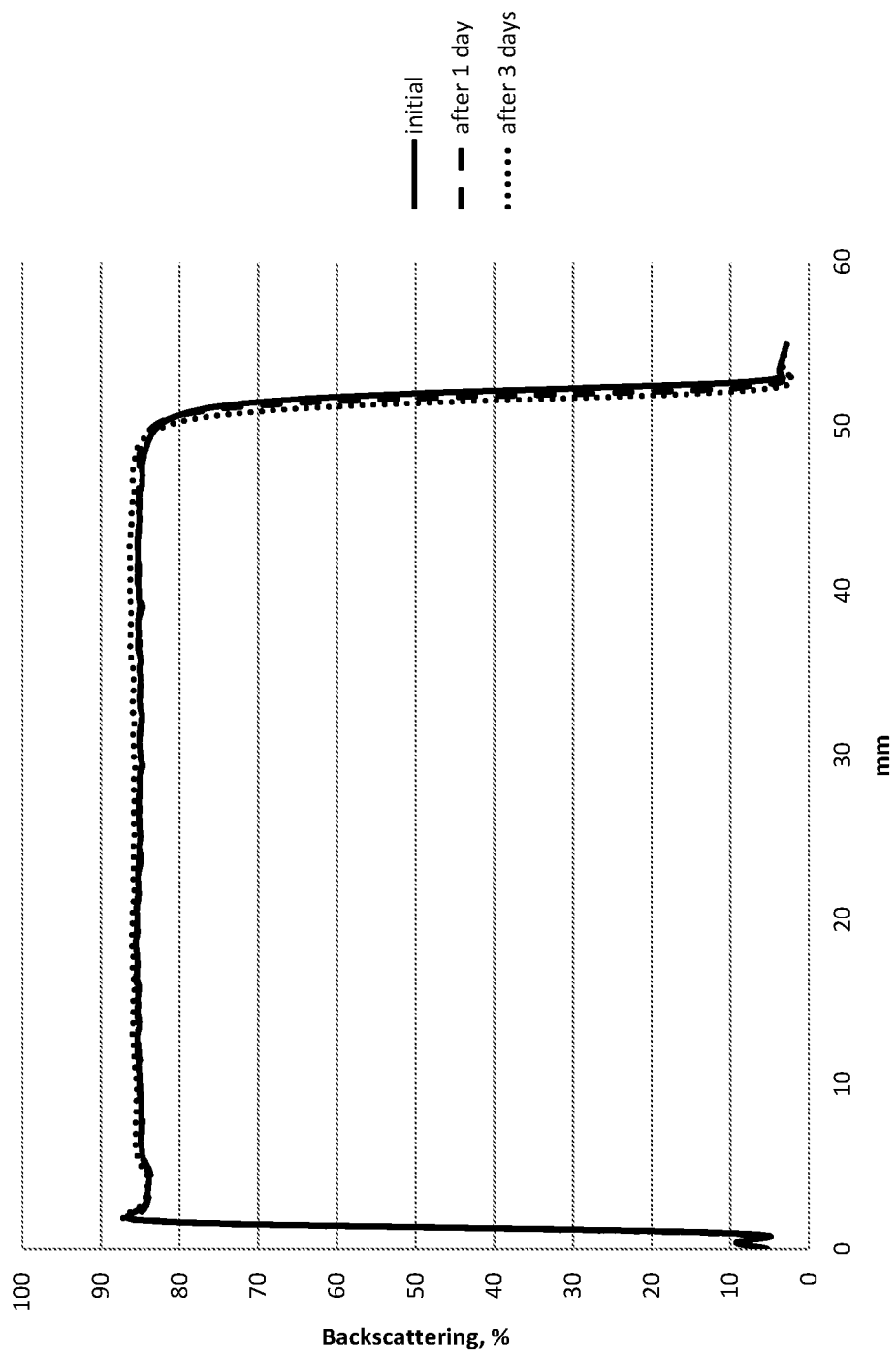
FIG. 2 is a plot showing light backscattering as a function of sample vessel depth for a composition of the invention, over a period of 3 days.

Settling stability of a crosslinker composition made according to the procedures of Examples 1, C1, and C2 were evaluated. A portion of each composition was allowed to remain undisturbed in a 30 mL glass cuvette at about 20° C. for 72 hours. Sedimentation of particulate species was measured multiple times during the test period using comparative light backscattering/transmission of the composition over the height of the sample in the cuvette. A TURBISCAN® LAB Expert (obtained from Formulaction SA of Union, France) was employed to carry out the measurements. FIG. 2 is a plot of % light backscattering of the composition of Example 1 as a function of height of the crosslinker composition in the bottle. The measurements confirmed that the composition of Example 1 formed no substantial sediment.

The sample was allowed to sit on a laboratory shelf for an additional 10 days after the 3 day experiment. At the end of the 13 day period, the composition had no visible sedimentation remaining on the bottom of the cuvette.

Figure 3:
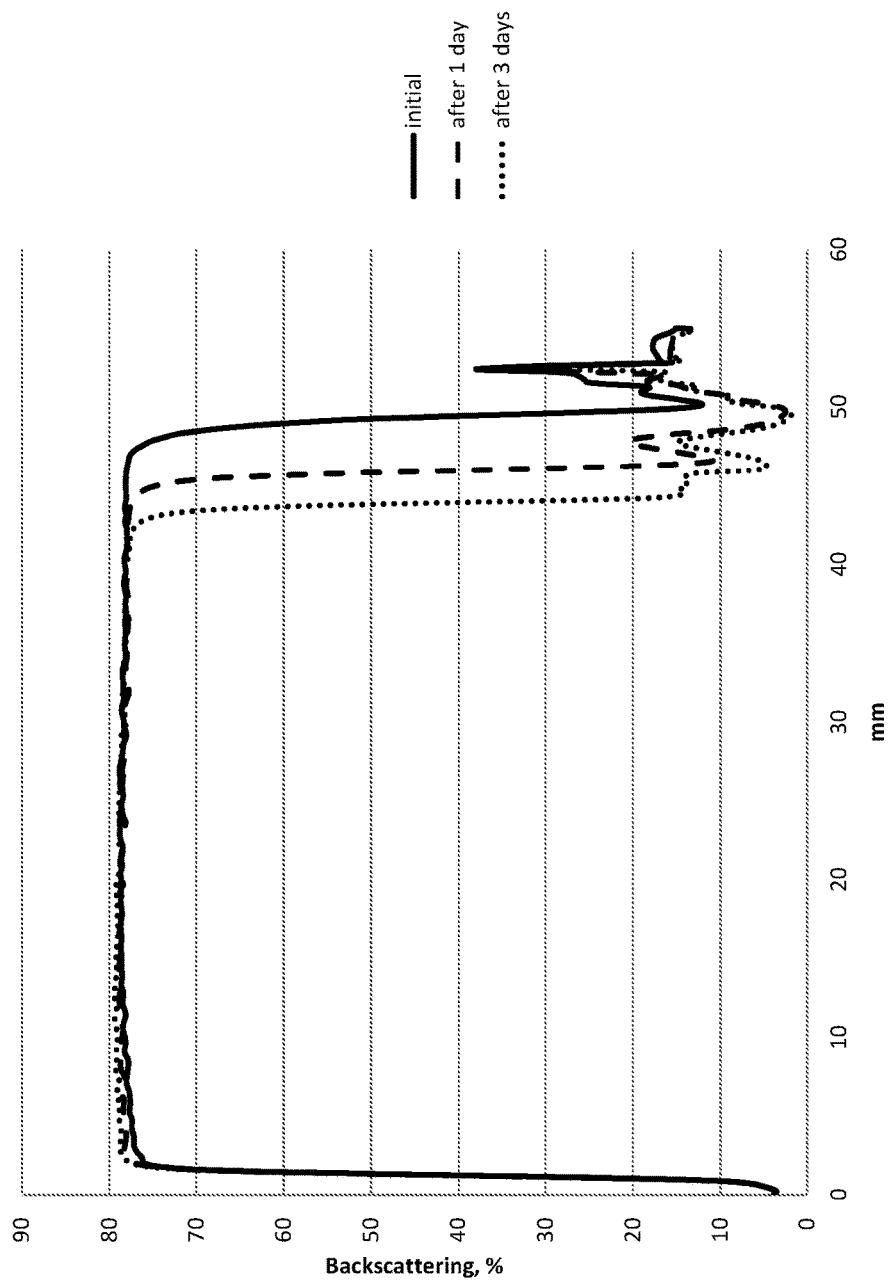
FIG. 3 is a plot showing light backscattering as a function of sample vessel depth for a composition, over a period of 3 days.
Figure 4:
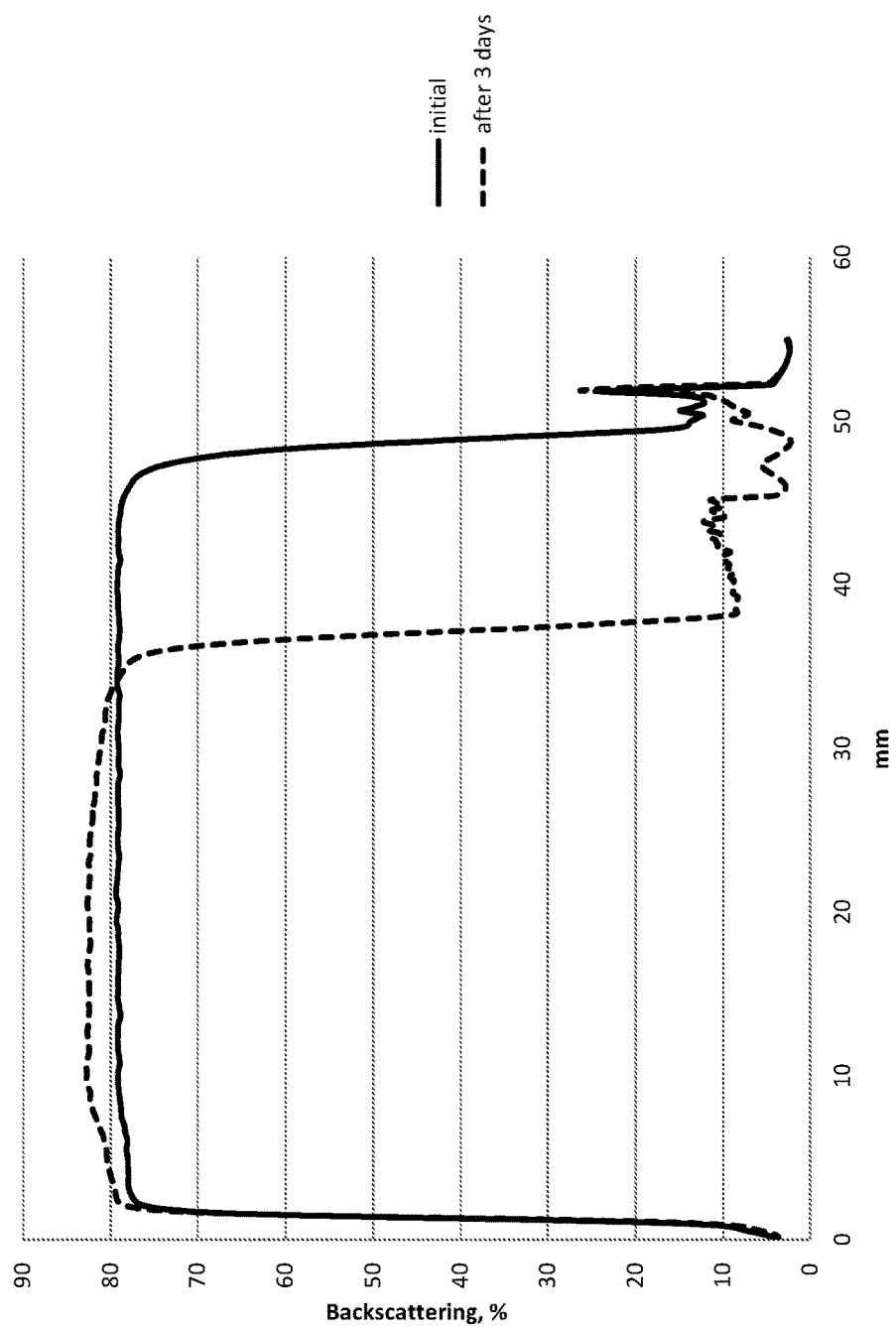
FIG. 4 is a plot showing light backscattering as a function of sample vessel depth for a composition, over a period of 3 days.

Sedimentation was also measured for Example C1 and Example C2. FIG. 3 is a plot of % light backscattering of the composition of Example C1 as a function of height of the crosslinker composition in the bottle over the 3 day period. FIG. 4 is a plot of % light backscattering of the composition of Example C2 as a function of height of the crosslinker composition in the bottle over the 3 day period. The studies confirmed that the C1 and C2 compositions undergo substantial settling over the 3 day period of testing.

The percentage of sedimentation for Examples 1, C1, and C2 was determined at the endpoint of the 3 day experiment, as measured by comparing the initial and final light scattering measurements for each sample over the entire height of the sample in the cuvette. The results are shown in Table 3.

Example C3

A combination of borate crosslinking agents in an aqueous brine of choline salts was formed according to Example 1 of U.S. Patent Publication No. 2014/0305650. Sedimentation was measured for the C3 combination according to the method of Example 3. The results are shown in Table 3.

TABLE 3

Percent sedimentation of Ex. 1, C1, C2, and C3 compositions after 3 days, as measured using the TURBISCAN® LAB Expert.

| Example | % Sedimentation @ 72 hours |
|---|---|
| 1 | 0.9 |
| C1 | 11 |
| C2 | 24 |
| C3 | 6 |

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A crosslinker composition consisting essentially of
about 5 wt % to 65 wt % of a borate species;
about 0.05 wt % to 10 wt % of a synthetic layered silicate; and
a water source.

2. The composition of claim 1 wherein borate species comprises $Na_2[B_4O_5(OH)_4] \cdot 8H_2O$.

3. The composition of claim 2 wherein the composition comprises about 0.5 wt % to 30 wt % $Na_2[B_4O_5(OH)_4] \cdot 8H_2O$.

4. The composition of claim 1 wherein the borate species comprises a sparingly soluble borate having the chemical formula

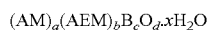
$(AM)_a(AEM)_bB_cO_d \cdot xH_2O$ wherein a, b, c and d are integers, $0 \leq a \leq 2$, $1 \leq b \leq 4$, $2 \leq c \leq 14$, $d=[0.5a+b+1.5c]$, $0<x<20$, AM is an alkali metal, and AEM is an alkaline earth metal.

5. The composition of claim 4 wherein the composition comprises about 30 wt % to 50 wt % of the sparingly soluble borate.

6. The composition of claim 4 wherein the sparingly soluble borate is Ulexite.

7. The composition of claim 1 wherein the borate species comprises a combination of $Na_2[B_4O_5(OH)_4] \cdot 8H_2O$ and a sparingly soluble borate.

8. The composition of claim 7 comprising about 0.5 wt % to 30 wt % $Na_2[B_4O_5(OH)_4] \cdot 8H_2O$ and about 30 wt % to 50 wt % of the sparingly soluble borate.

9. The composition of claim 1 wherein the composition comprises about 0.5 wt % to 2 wt % of the synthetic layered silicate.

10. The composition of claim 1 wherein the synthetic layered silicate is a lithium-magnesium-sodium silicate.

11. The composition of claim 1 wherein the synthetic layered silicate is characterized as having the chemical formula $Na_{0.3}(Mg,Li)_3Si_4O_{10}(OH)_2$.

12. The composition of claim 1 wherein the particle size of the synthetic layered silicate is about 5 nm to to 100 nm in the longest direction.

13. The composition of claim 1 wherein the water source is present at about 30 wt % to 80 wt %.

14. The composition of claim 1 wherein the water source has a density of about 998 kg/m³ to 1050 kg/m³.

15. An injectable composition comprising the crosslinker composition of claim 1 and an hydroxyl functional polymer.

16. The injectable composition of claim 15 further comprising a proppant.

17. A method of forming an injectable composition, the method comprising
forming a crosslinker composition of claim 1,
forming an aqueous polymer solution comprising about 0.01 wt % to 5 wt % of an hydroxyl functional polymer; and
combining the crosslinker composition with the aqueous polymer solution at a ratio of about 1:100 to 1:5000 vol:vol crosslinker composition:aqueous polymer solution to form an injectable composition having a pH of about 8 to 14.

18. The method of claim 17 wherein the aqueous polymer solution comprises about 0.5 wt % to 2 wt % of an hydroxyl functional polymer.

19. The method of claim 17 wherein the hydroxyl functional polymer is guar gum, carboxyl functionalized guar, or a combination thereof.

20. The method of claim 17 wherein the ratio is about 1:200 to 1:2000.

21. A method of recovering hydrocarbon compounds, the method comprising
forming a crosslinker composition of claim 1,
forming an aqueous polymer solution comprising about 0.01 wt % to 5 wt % of an hydroxyl functional polymer,
combining the crosslinker composition with the aqueous polymer solution at a ratio of about 1:100 to 1:5000 vol:vol crosslinker composition:aqueous polymer solution to form an injectable composition having a pH of about 8 to 14,
injecting the injectable composition into one or more subterranean hydrocarbon-containing reservoirs; and
recovering hydrocarbon compounds from the one or more reservoirs.

22. The method of claim 21 further comprising adding about 0.01 kg to 1.5 kg of a proppant per liter of the injectable composition.

23. The method of claim 22 wherein the proppant comprises natural sand, silica, bauxite, a ceramic, a resin-coated sand, or a combination of two or more thereof.

* * * * *